(12) United States Patent
Grannan et al.

(10) Patent No.: US 9,838,461 B2
(45) Date of Patent: Dec. 5, 2017

(54) SYSTEM AND METHOD FOR HANDLING DIGITAL CONTENT DELIVERY TO PORTABLE DEVICES

(75) Inventors: Michael Grannan, Austin, TX (US); Lalitha Suryanarayana, Austin, TX (US); David Patron, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1294 days.

(21) Appl. No.: 12/464,058

(22) Filed: May 11, 2009

(65) Prior Publication Data

US 2009/0216892 A1 Aug. 27, 2009

Related U.S. Application Data

(63) Continuation of application No. 10/346,722, filed on Jan. 17, 2003, now Pat. No. 7,533,158.

(51) Int. Cl.
*H04L 29/08* (2006.01)
*H04L 29/06* (2006.01)
*H04W 12/08* (2009.01)

(52) U.S. Cl.
CPC .............. *H04L 67/06* (2013.01); *H04L 67/04* (2013.01); *H04L 67/14* (2013.01);
(Continued)

(58) Field of Classification Search
CPC .......... H04L 67/04; H04L 67/06; H04L 67/14
(Continued)

(56) References Cited

U.S. PATENT DOCUMENTS 5,566,225 A * 10/1996 Haas .............................. 455/423
5,815,194 A * 9/1998 Ueda ................. H04N 21/47202
348/E7.071

(Continued)

FOREIGN PATENT DOCUMENTS

| GB | 2 301 744 | 12/1996 |
| GB | 2 359 450 | 8/2001 |
| WO | 03039009 | 5/2003 |

OTHER PUBLICATIONS

"SyncML Representation Protocol Version 1.0", Dec. 7, 2000, p. 8.*
(Continued)

*Primary Examiner* — Douglas Blair
(74) *Attorney, Agent, or Firm* — Toler Law Group, PC

(57) ABSTRACT

Systems and methods to download digital data files are provided. A particular method includes sending authentication data and a request to download a digital data file from a portable computing device to a remote network device via a first network access point. A first portion of the digital data file is received at the portable computing device. The first portion does not include a remaining portion of the digital data file. Communication is established between the portable computing device and a second network access point after communication is lost between the portable computing device and the first network access point and before the remaining portion of the digital data file is received. The remaining portion of the digital data file is received at the portable computing device without sending a second request related to downloading the digital data file.

21 Claims, 5 Drawing Sheets

DIGITAL FILE DOWNLOAD STATUS REGISTRY

| DEVICE ID (202) | USER ID (204) | CONTENT ID (206) | BYTE COUNT (208) | FILE SIZE (210) | ACCESS TIME STAMP (212) | DESTINATION URL (214) |
|---|---|---|---|---|---|---|
| DEVICE #1 | USER #1 | DVD # | A | F1 | T1 | D1 |
| DEVICE #2 | USER #2 | CD # | B | F2 | T2 | D2 |
| DEVICE #3 | USER #3 | SOFTWARE FILE | C | F3 | T3 | D3 |
| DEVICE #4 | USER #4 | MUSIC FILE | D | F4 | T4 | D4 |

(52) U.S. Cl.
CPC ...... *H04L 63/0815* (2013.01); *H04L 67/1095* (2013.01); *H04L 2463/101* (2013.01); *H04W 12/08* (2013.01)

(58) Field of Classification Search
USPC .......................................................... 709/219
See application file for complete search history.

(56) References Cited

U.S. PATENT DOCUMENTS

| | | | |
|---|---|---|---|
| 6,243,581 | B1 | 6/2001 | Jawanda |
| 6,408,315 | B1* | 6/2002 | McManus ................ G09B 5/06 348/14.13 |
| 6,546,425 | B1* | 4/2003 | Hanson et al. ............... 709/227 |
| 7,046,657 | B2 | 5/2006 | Harrington et al. |
| 7,085,744 | B2 | 8/2006 | Morrison |
| 7,165,173 | B1 | 1/2007 | Herle |
| 7,286,651 | B1* | 10/2007 | Packingham et al. ..... 379/88.14 |
| 7,334,720 | B2* | 2/2008 | Hulst et al. ................... 235/380 |
| 7,379,958 | B2 | 5/2008 | Karhu |
| 7,533,158 | B2* | 5/2009 | Grannan et al. ............... 709/219 |
| 7,729,480 | B1* | 6/2010 | Packingham et al. ..... 379/88.14 |
| 2002/0010758 | A1 | 1/2002 | Chan |
| 2002/0021689 | A1 | 2/2002 | Robbins et al. |
| 2002/0062385 | A1 | 5/2002 | Dowling |
| 2002/0085719 | A1* | 7/2002 | Crosbie ............. H04W 36/0011 380/248 |
| 2002/0143971 | A1* | 10/2002 | Govindarajan et al. ...... 709/230 |
| 2002/0157036 | A1 | 10/2002 | Nakamura |
| 2002/0162026 | A1* | 10/2002 | Neuman ............. H04L 63/0227 726/4 |
| 2003/0084165 | A1 | 5/2003 | Kjellberg et al. |
| 2003/0172090 | A1* | 9/2003 | Asunmaa ................ G06F 21/31 |
| 2003/0236864 | A1 | 12/2003 | Lai |
| 2004/0054650 | A1 | 3/2004 | Chun |
| 2004/0203684 | A1 | 10/2004 | Jokinen et al. |
| 2004/0205263 | A1 | 10/2004 | Sivaraman et al. |
| 2008/0134018 | A1* | 6/2008 | Kembel ............ G06F 17/30899 715/234 |

OTHER PUBLICATIONS

International Search Report and Written Opinion of the International Searching Authority for International Application No. PCT/US04/00552, dated Aug. 24, 2004.
Stemberger, S., "Syncing data: An introduction to SyncML", http://www-106.ibm.com/developerworks/wireless/library/wi-syncml/, Oct. 2001. U.S. Appl. No. 10/346,722.
European Search Report PCT/US2004000552 dated Nov. 7, 2007.

* cited by examiner

DIGITAL FILE DOWNLOAD STATUS REGISTRY

| DEVICE ID | USER ID | CONTENT ID | BYTE COUNT | FILE SIZE | ACCESS TIME STAMP | DESTINATION URL |
|---|---|---|---|---|---|---|
| DEVICE #1 | USER #1 | DVD # | A | F1 | T1 | D1 |
| DEVICE #2 | USER #2 | CD # | B | F2 | T2 | D2 |
| DEVICE #3 | USER #3 | SOFTWARE FILE | C | F3 | T3 | D3 |
| DEVICE #4 | USER #4 | MUSIC FILE | D | F4 | T4 | D4 |

*FIG 2*

SYSTEM AND METHOD FOR HANDLING DIGITAL CONTENT DELIVERY TO PORTABLE DEVICES

CLAIM OF PRIORITY

The present application claims priority from and is a continuation of patent application Ser. No. 10/346,722 filed on Jan. 17, 2003 and entitled "SYSTEM AND METHOD FOR HANDLING DIGITAL CONTENT DELIVERY TO PORTABLE DEVICES," the contents of which are expressly incorporated herein by reference in their entirety.

FIELD OF THE DISCLOSURE

The present application relates generally to a method and a system for digital data file downloads to portable devices.

BACKGROUND

While wireless data networks are available at certain locations where portable computer users congregate, such as at certain coffee houses and airports, such networks have not provided ubiquitous coverage. As a result, systems to support a digital economy where digital files may be communicated and purchased by mobile consumers has not been deployed. It would be desirable for portable computing device users to select, purchase and download digital content conveniently and without unduly restricting the user's mobility.

Accordingly, there is a need for an improved method and system of handling downloads of digital data files to portable devices.

SUMMARY

The present disclosure relates generally to a method and system for handling downloads of digital data files to portable computing devices. In a particular embodiment, the system includes a first system access point responsive to a first wireless access point at a first location; a second system access point responsive to a second wireless access point at a second location; and a central facility. The central facility includes a computer having a user sign-on module to permit wireless download access to digital data files by a portable device within communication range of either the first wireless access point or the second wireless access point. The central facility includes a digital data file download status memory, the digital data file download status memory including an indication of download status and including an indication of the portion of a requested digital data file that has been downloaded.

In another particular embodiment, the system is coupled to a first wireless access point via a first network and coupled to a second wireless access point via a second network. The system includes a server computer having a mobile user sign-on module to permit wireless download access to digital data files by a portable device within communication range of the first wireless access point and a second portable device within communication range of the second wireless access point. The system also includes a digital data file download status memory, the status memory including at least one field to store an entry to indicate the portion of a requested digital data file that has been downloaded to a first portable computing device via the first wireless access point.

In another particular embodiment, the method includes starting a download of digital data from a server to a portable computing device, the portable computing device in remote communication with the server via a wireless communication channel. The method also includes determining that the download is interrupted prior to completion of the download of digital data and storing data associated with a user of the portable computing device and data associated with the download of digital data in a status registry memory.

In a further embodiment, a method of operating a computer network with access to digital data content available for download is disclosed. The method includes determining that a portable device is in communication with a first wireless access point coupled to the computer network, the first wireless access point at a first location; authenticating the portable device and the user; receiving a selection from the portable device of digital data content to be downloaded; starting a download of the digital data content to the portable device via the first wireless access point; determining that the download of the digital data content is interrupted prior to completion; determining that the portable device is in communication with a second wireless access point coupled to the computer network, the second wireless access point at a second location; re-authenticating the portable device; re-authenticating the user; optionally prompting the portable device with an option to continue the download of the digital data content; and restarting the download of the digital data content to the portable device via the second wireless access point at the point in the digital data content where the download was interrupted.

BRIEF DESCRIPTION OF THE DRAWINGS

FIG. 2 is a general diagram that illustrates a digital data file download status registry memory.

DETAILED DESCRIPTION

Figure 1:
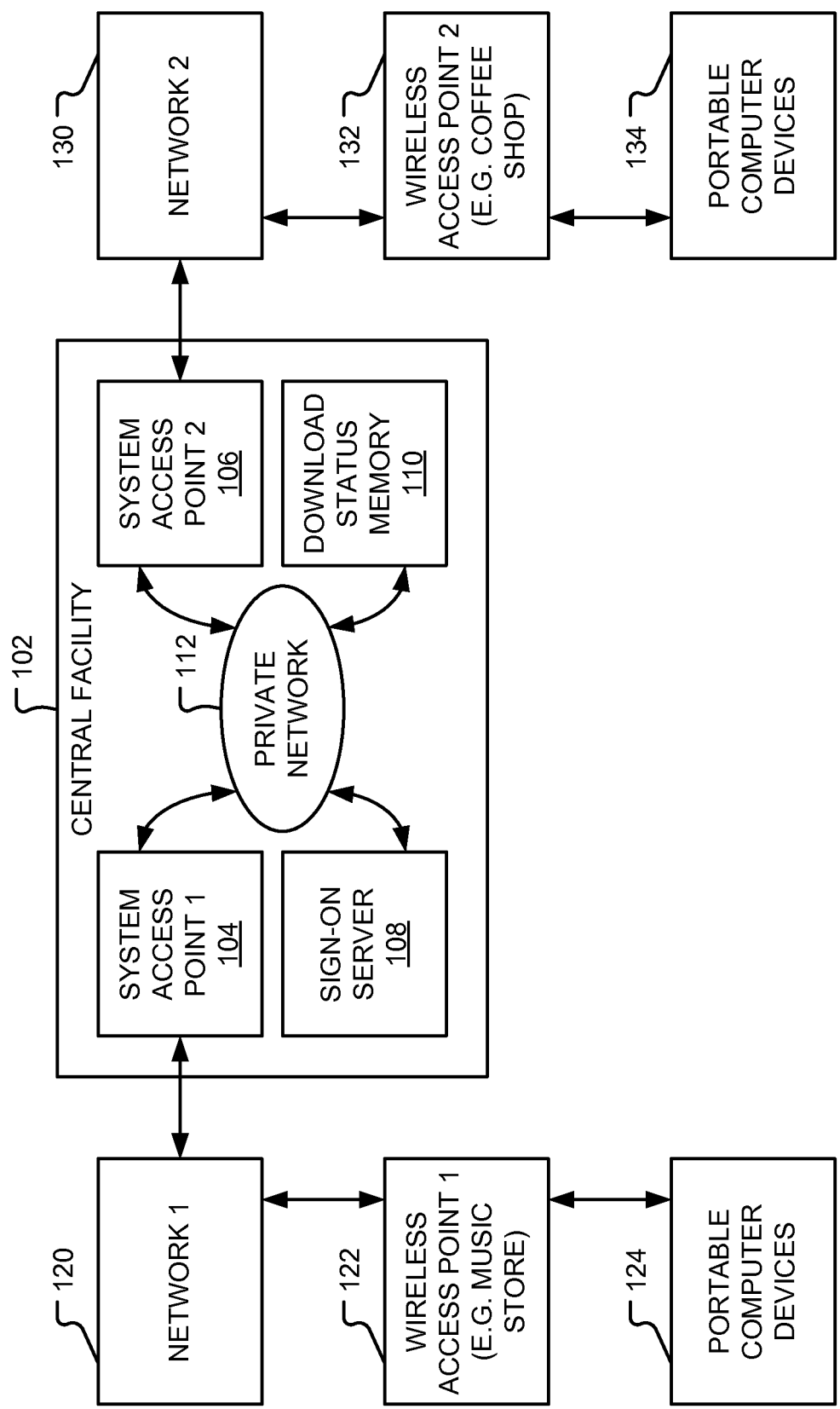
FIG. 1 is a block diagram that illustrates an embodiment of a system that may be used to download digital data files to portable devices.

Referring to FIG. 1, a wireless communication system is illustrated. The wireless communication system includes a central facility 102, a first network 120, a first wireless access point 122, a second network 130, and a second wireless access point 132. The first wireless access point 122 provides a range of wireless communication coverage for portable computer devices 124. Similarly, the second wireless access point 132 provides a range of wireless communication coverage for certain portable computing devices 134. Such wireless coverage may be provided by a wireless network, such as the industry standard 802.11 type of wireless data network. The central facility 102 includes a first system access point 104, a second system access point 106, a sign-on server 108, and a download status memory registry 110. The first and second system access points, the sign-on server, and the download status memory are interconnected and coupled via an internal private network 112.

During system operation, a portable computing device, such as a first representative portable computer device 124 may receive access to the first network 120 via the first wireless access point 122. As an example operation, the portable computer device 124 may request a download of certain digital data files. In this scenario, the user request from the portable computer device 124 is fed from the wireless access point 122 through the first network 120 to the first system access point 104. At this point in the operation a request is made to authenticate the portable computer device user and the device 124 via the sign-on server 108. Upon authenticating and providing authorized access to the user and the device, a request may be processed for accessing a selected digital data file, such as a music CD-ROM file selection. After receiving the request the server within the central facility provides the access to the digital data file selected and starts downloading the file from the first system access point 104 to the portable computer device user 124 via the first network 120 and the first wireless access point 122. During the digital download a user of the portable device 124 may move locations such that the user becomes out of range from the first wireless access point 122. In this scenario, the digital download has not been completed and therefore has been interrupted. At the point of interruption, the amount of data that has been communicated and downloaded to the portable computing device 124 is stored within the download status memory 110. In addition, the download status memory may include other information regarding the download such as the device ID, the user ID, the selected content ID, file size, time stamp and a destination URL.

After a period of time where the portable computing device has been out of range, the user may return to either the same wireless access point 122 or may travel to a new wireless access point such as the second wireless access point 132. After regaining access to the communication system, the portable computing device user may request continuation of the partially downloaded data file. Alternatively, the continuation of the download may automatically occur. In an illustrative scenario, the portable device and the user is reauthenticated by the sign-on-server 108 through the second network 130 and the second system access point 106. After reauthentication, the digital data file download is restarted at the point in the file where the prior interruption took place. Thus, the remainder of the digital data file is downloaded from the central facility to the portable computing device via the second network 130 and the second wireless access point 132. An example of a location for the second wireless access point 132 is within a coffee shop or other community center that provides convenient access to wireless computing users. While the portable computing devices 124 and 134 have different numerical indications they may represent the same physical portable device or may represent different portable devices having access to the respective wireless access points 122, 132.

Referring to FIG. 2, an example of further details of a digital file download status registry memory 200 is shown. The download status registry 200 may include a plurality of different data fields characterizing the particular digital file download. The status registry may include representative fields such as a device identification (ID) 202, a user ID 204, a digital content ID 206, byte count 208, file size 210, last access timestamp 212, and destination URL 214. The download status registry 200 also includes a plurality of row entries that identify different devices and users that may have access to different digital files being downloaded. The byte count field 208 indicates the number of bytes that have been downloaded to the user. This byte count is then saved when the mobile user download is interrupted and then may be recalled from memory to restart the download at the point of interruption. Also shown, the digital download may include a variety of different types of content such as DVDs, CDs, software files, and other types of digital content that may be represented as downloaded data.

Figure 3:
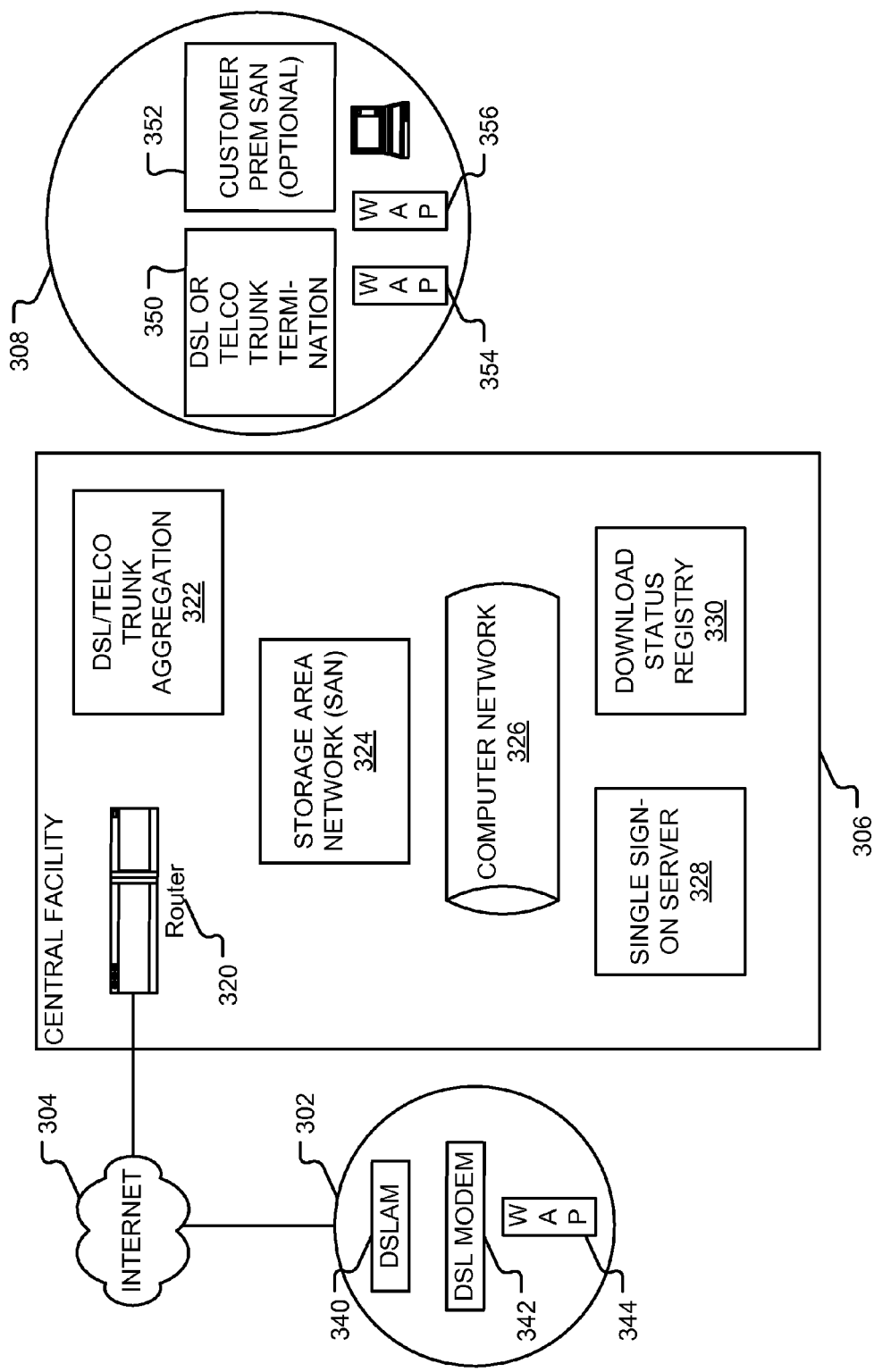
FIG. 3 is a block diagram that illustrates a further detailed embodiment of a system that may be used to download digital files to portable devices.

Referring to FIG. 3, a further detailed example implementation of a representative communication system including a download status registry and having a download suspension and resumption capability is illustrated. With this implementation, a central facility 306 is provided. The central facility 306 is coupled to a first network point 302 via the internet 304. The central facility 306 is also directly connected to a second network point 308. The first network point 302 includes a representative digital subscriber line access multiplexer (DSLAM) 340, a digital subscriber line (DSL) modem 342, and a wireless access point (WAP) interface 344. The second network point 308 includes a DSL or telephone company trunk termination 350, a customer storage unit 352, and multiple wireless access point interfaces 354 and 356. The central facility 306 includes an internal router 320, a DSL/TELCO trunk aggregation unit 322, a computer network 326, and a storage area network (SAN) 324. The computer network 326 interconnects a single sign-on server 328 and the download status registry 330. The illustrated system may be used to determine what portion of a digital data file that has been previously downloaded to a particular portable device from the central serving authority and also provides for communication failures and lack of access, such as due to portable device movement out of range from a wireless access network. Thus, the system supports a seamless download of requested digital content when wireless subscribers roam between various locations that are supported by a federation of different wireless networks with a centralized user authentication capability. In a particular embodiment, the download status registry 330 may be implemented using a SyncML compliant server and associated client processes.

Figure 4:
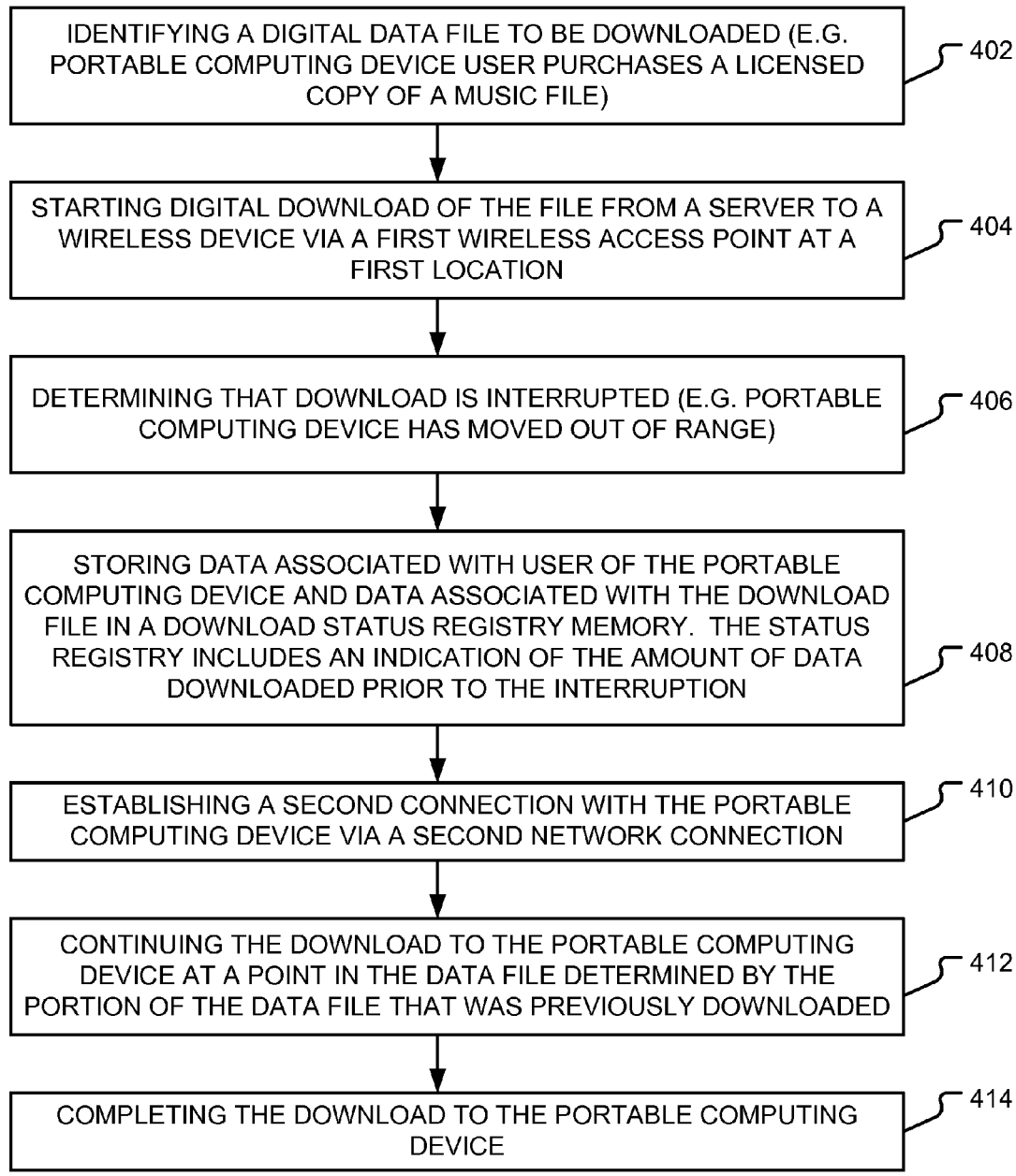
FIG. 4 is a flow chart that illustrates an embodiment of a method of handling digital data file downloads to portable devices.

Referring to FIG. 4, a method of using the illustrated systems is shown. During operation, a digital data file to be downloaded may be identified, at 402. An example is where a portable computing device user purchases a particular licensed copy of a music file. Other digital data that may be downloaded includes video content, software, application synchronization data, and software upgrades. The digital download of the selected file is then started at a server to the portable computing device via a first wireless access point at a first location at 404. At a certain point during the download it is determined that a download has been interrupted, at 406. An example of such interruption may be caused when a portable device has moved out of range from the first wireless access point. After determination of the interruption, such as by use of a timer or other detection mechanism, the data associated with the user of the portable computing device and data associated with the download file and its download progress is stored in a download status registry memory. The status registry memory includes an indication of the amount of data downloaded prior to the interruption, at 408.

At a later time after the portable computing device returns to a communication range of a wireless access point, a second connection with the portable computing device is established, such as via a second network connection at 410. This second network connection could be the original wireless access point, such as where a portable device user returns to the original location or where the first connection was lost and later re-established for other reasons. Alternatively, the second network connection may be a second wireless access point or may be an entirely different alternate download network, such as a wide area data network or direct network such as a local area network (LAN). After establishing the second connection, the download of the digital data file may be continued to the portable computing device at the point in the data file that is determined based on the portion of data that was previously downloaded, at 412. The download to the portable computing device of the remainder of the digital data file is then completed, at 414. It should be noted that a download can be discontinued one or more times.

Figure 5:
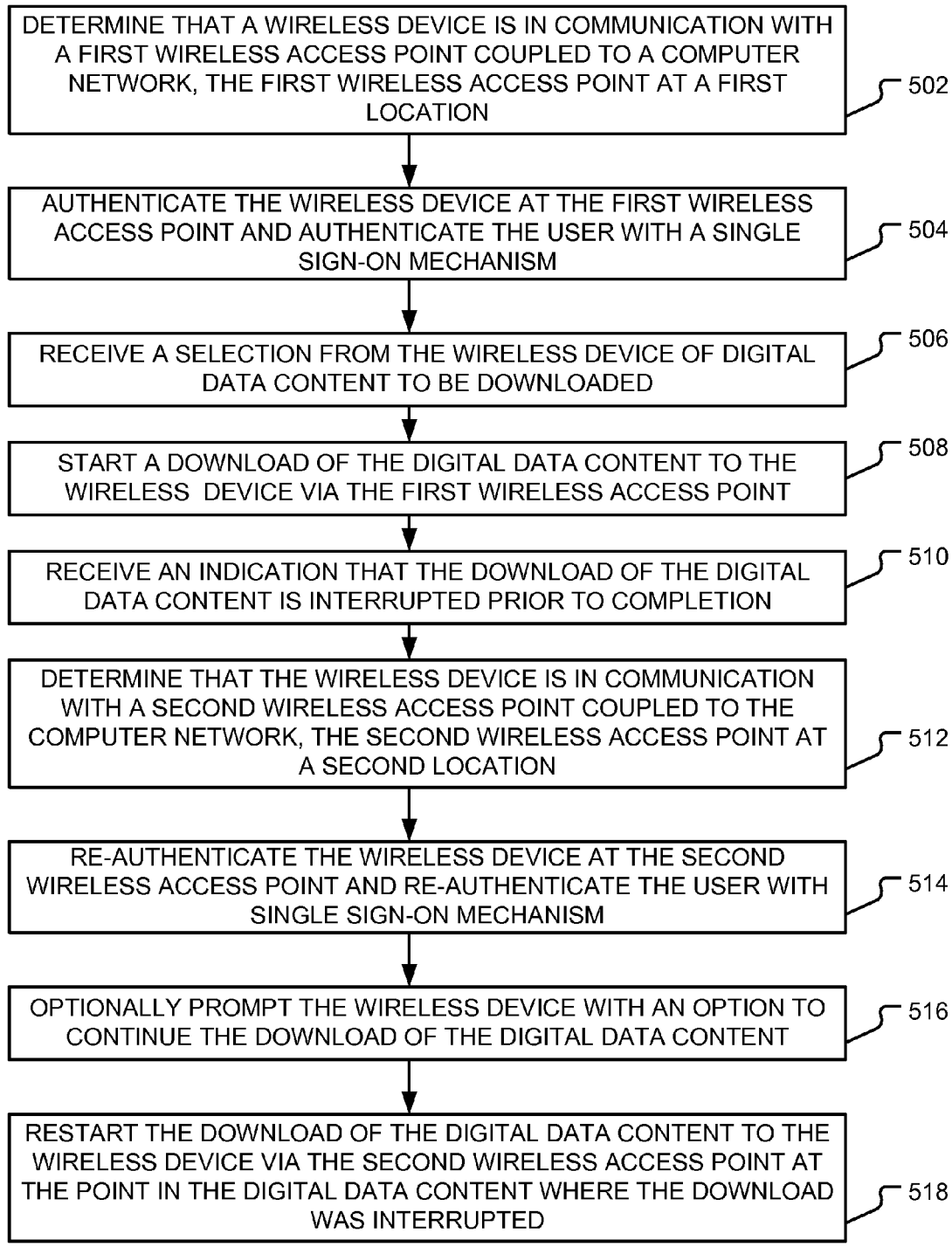
FIG. 5 is a flow chart that illustrates another embodiment of a method of handling digital data file downloads to portable devices.

Further details of a method of using the illustrated systems are disclosed in FIG. 5. Referring to FIG. 5, a first step in a representative method of operation is to determine that a portable computing device is in communication with a first wireless access point coupled to a computer network, at 502. The first wireless access point is at a first location. The portable device is then authenticated at the first wireless access point and the user is also authenticated by a single sign-on server mechanism, at 504. A selection of digital content is received from the portable device for a selected data file to be downloaded, at 506. The download of the digital data content is started, at 508. At some point during the download, an indication is received that the download of the digital data content has been interrupted prior to completion, at 510. At a later time, it is determined that the portable device is again in communication with and has access to the data server, such as via a second wireless access point connection at 512. The portable device is then re-authenticated at the appropriate access point and the user is also re-authenticated using the single sign-on mechanism, at 514. The portable device user may be optionally prompted to continue the download of the digital data content, at 516. If the continuation option is selected by the user, the download of the digital data content is restarted at the point in the digital data content file where the download was interrupted previously, at 518. To determine the point in the digital data content file for restart, the central facility may read the digital file download registry memory to determine the point to continue the download file. After the selected restart of the digital file download, the download to the portable computing device is completed and the portable computing device user then has access to the entire selected data content file.

In a particular embodiment, a system includes a first system access point responsive to a first wireless access point at a first location and a second system access point responsive to a second wireless access point at a second location. The first and second system access points may include network access connections selected from a wide area network and a direct network connection.

The system also includes a central facility. The central facility includes a computer having a user sign-on module to permit wireless download access to digital data files by a portable device within communication range of at least one of the first wireless access point and the second wireless access point. The central facility may also include a storage area network. Digital data files to be downloaded are stored on the storage area network. The central facility also includes a digital data file download status memory. The digital data file download status memory includes an indication of download status and an indication of the portion of a requested digital data file that has been downloaded. The digital data file download status memory may also include an entry that indicates that a particular digital data file download is temporarily suspended due to a download interruption. For example, the download interruption may be in response to the central facility determining that a portable device has moved out of range for continued data communication. Before resuming the download after establishing a connection with the second access point, a server may communicate in real time with a portable device client to query its capabilities and to carry out any capabilities negotiation that might be required for download purposes. For example, such capabilities may include available disk space. In a particular embodiment, the computer and associated portable devices are SyncML compliant and a SyncML protocol is used to facilitate discontinuous download of a digital data file.

In a particular embodiment, a system is coupled to a first wireless access point via a first network and is coupled to a second wireless access point via a second network. The system includes a server computer having a mobile user sign-on module to permit wireless download access to digital data files by a portable device within communication range of the first wireless access point and a second portable device within communication range of the second wireless access point. The system also includes a digital data file download status memory. The digital data file status memory includes at least one field to store an entry to indicate the portion of a requested digital data file that has been downloaded to a first portable computing device via the first wireless access point. The digital data file status memory also includes a second field to store a second entry to indicate the portion of a second requested digital data file that has been downloaded to a second portable computing device via the second wireless access point. The first portable computing device may move from a first location within range of the first wireless access point to a second location within range of the second wireless access point. A first portion of a digital data file may be downloaded to the first computing portable device via the first wireless access point and a second portion of the digital data file may be downloaded to the first portable computing device via the second wireless access point. In an illustrative embodiment, the first and second wireless access points are the same.

In a particular embodiment, a method includes starting a download of digital data from a server to a portable computing device. For example, the digital data may be selected from music, video, software content, application synchronization data, downloadable software radio modules for configuring the portable computing device to support a new wireless data transmission protocol, and software upgrade modules. The method may also include determining that a user associated with the portable computing device selected and purchased a licensed copy of the digital data prior to the download.

The portable computing device may be in remote communication with the server via a wireless communication channel. The method also includes determining that the download is interrupted prior to completion of the download of digital data. For example, determining that the download is interrupted may include determining that the portable computing device has moved outside the range of the wireless communication channel, resulting in interruption of the download. The method further includes storing data associated with a user of the portable computing device and data associated with the download of digital data in a status registry memory. The data stored in the status registry memory may include a byte count indicating the amount of data downloaded to the portable computing device prior to a download interruption. The status registry memory may include fields that identify devices, users, and content uniquely.

The method may also include establishing a second connection with the portable computing device via a second network. The second network may be an alternative access network selected from a wide area network and a local area network connection. The method may also include continuing the download of the digital data at the point where the download delivery was previously interrupted. The remainder of the download may be communicated to the portable computing device via the second connection. The method may also include completing the download of the digital data to the portable computing device.

In a particular embodiment, a method of operating a computer network with access to digital data content available for download includes determining that a portable device is in communication with a first wireless access point coupled to the computer network. The method also includes authenticating the portable device and the user. The method may also include receiving a selection from the portable device of digital data content to be downloaded. In a particular illustrative embodiment, the digital data content download is initiated from a secondary device but directed to be performed on the portable device. A download of the digital data content to the portable device is started via the first wireless access point. The method also includes determining that the download of the digital data content is interrupted prior to completion.

The method further includes determining that the portable device is in communication with a second wireless access point coupled to the computer network. In an illustrative embodiment, the first wireless access point is at a first location and the second wireless access point at a second location. For example, the first and second wireless access points may be on separate physical networks. In another illustrative embodiment, the first and second wireless access points are the same. The method also includes re-authenticating the portable device and the user. For example, the user may be authenticated and re-authenticated with a single sign-on mechanism. Optionally, the method may include prompting the portable device with an option to continue the download of the digital data content. The method may also include restarting the download of the digital data content to the portable device via the second wireless access point at the point in the digital data content where the download was interrupted.

The above disclosed subject matter is to be considered illustrative, and not restrictive, and the appended claims are intended to cover all such modifications, enhancements, and other embodiments which fall within the true scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    determining at a system that a portable device is in communication with a first institute of electrical and electronics engineers 802.11 compliant wireless access point at a first location, the system including a sign-on server, a first system access point, a second system access point, a download status memory and a private network;
    receiving, at the system, a selection from the portable device of a digital data file to be downloaded, the selection received via the first institute of electrical and electronics engineers 802.11 compliant wireless access point, a first network, and the first system access point;
    starting a download of the digital data file from the system to the portable device via the first system access point, the first network, the first institute of electrical and electronics engineers 802.11 compliant wireless access point, and the first network, wherein the portable device is authorized to download the digital data file by the sign-on server based on a request for authentication received from the portable device via the first institute of electrical and electronics engineers 802.11 compliant wireless access point, the first network, the first system access point, and the private network;
    determining that the download of the digital data file is interrupted prior to completion, wherein information identifying a download status of the digital data file is stored in the download status memory, wherein the information includes an identifier associated with the download, a digital content identifier associated with the download, a byte count associated with the download, a file size associated with the download, a last access timestamp, and a destination universal resource locator associated with the download;
    determining that the portable device is in communication with a second institute of electrical and electronics engineers 802.11 compliant wireless access point at a second location;
    in response to a determination that the portable device is in communication with the second institute of electrical and electronics engineers 802.11 compliant wireless access point, sending a prompt to the portable device with a continuation option to resume downloading the digital data file, wherein resuming downloading includes downloading a remainder portion of the digital data file; and
    responsive to receipt of a selection of the continuation option, resuming the download of the digital data file from the system to the portable device via the second system access point, a second network, and the second institute of electrical and electronics engineers 802.11 compliant wireless access point at a point in the digital data file where the download was interrupted, wherein resuming the download includes a determination by the sign-on server that the portable device is authorized to download the digital data file based on a second request for authentication received from the portable device via the second institute of electrical and electronics engineers 802.11 compliant wireless access point, the second network, and the second system access point, and wherein the second network is distinct from the first network.

2. The method of claim 1, wherein a secondary device initiates the download to be performed on the portable device, wherein the secondary device is distinct from the portable device.

3. The method of claim 1, further comprising determining that a user associated with the portable device is associated with a purchase of a licensed copy of the digital data file.

4. The method of claim 3, wherein the digital content identifier indicates a content type of the digital data file.

5. The method of claim 1, wherein the first network includes a wireless network and the second network includes a wired network, and wherein the sign-on server includes a single sign-on server.

6. The method of claim 1, wherein the first network includes a wide area network and the second network includes a local area network.

7. A system comprising:
    a download status memory; and a server configured to access the download status memory the server including:
a processor; and
a memory storing instructions, wherein the processor is configured to execute the instructions to perform operations including:
initiating storage of information at the download status memory in response to interruption of a download of a digital data file to a portable device via a first access point, the information including an identifier of the portable device, a user identifier associated with the download, a digital content identifier associated with the download, a byte count associated with the download, a file size associated with the download, a last access timestamp, and a destination universal resource locator associated with the download,
initiating transmission, to the portable device via a second access point, of a prompt including a continuation option to resume downloading the digital data file in response to detection of the portable device coupled to a second access point based on the information, and
initiating transmission, responsive to receipt of acceptance of the continuation option, of a remainder portion of the digital data file to the portable device, the remainder portion determined based on the information.

8. The system of claim 7, wherein the first access point and the second access point are the same access point.

9. The system of claim 7, wherein the server is configured to send a first portion of the digital data file to the portable device in response to a request for the digital data file received from the portable device.

10. The system of claim 7, wherein the server is configured to send a first portion of the digital data file to the portable device in response to a request for the digital data file received from a second device distinct from the portable device.

11. The system of claim 7, wherein the server is configured to receive capabilities information associated with the portable device before the server sends the remainder portion to the portable device.

12. The system of claim 11, wherein the capabilities information includes a data storage capacity of the portable device.

13. The system of claim 11, wherein the server comprises a single sign-on server.

14. A method comprising
receiving, at a server, a command to download a digital data file to a portable device;
detecting, at the server, that the portable device is coupled to the server via a first access point;
initiating a download of the digital data file from the server to the portable device via the first access point in response to a determination that the portable device is coupled to the first access point;
saving information from the server to a download status memory in response to a determination that the download of the digital data file is interrupted prior to completion, wherein the information includes an identifier associated with the download, a digital content identifier associated with the download, a byte count associated with the download, a file size associated with the download, a last access timestamp, and a destination universal resource locator associated with the download;
subsequent to interruption of the download, determining that the portable device is coupled to the server via a second access point;
sending, from the server to the portable device via the second access point, a prompt including a continuation offer to resume downloading the digital data file based on the information; and
responsive to receipt of acceptance of the continuation offer, sending a remainder portion of the digital data file to the portable device, the remainder portion determined based on the information.

15. The method of claim 14, wherein the command is received from the portable device.

16. The method of claim 14, wherein the command is received from a second device distinct from the portable device.

17. The method of claim 14, wherein the server receives information indicating a data storage capacity of the portable device from the portable device before sending the remainder portion to the portable device.

18. A method comprising:
based on information saved by a server to a download status memory in response to a determination that download of a digital data file to a portable device is interrupted prior to completion of the download, determining, at the server, that the portable device is coupled to an access point that enables access to the server, wherein the information includes an identifier associated with the download, a digital content identifier associated with the download, a byte count associated with the download, a file size associated with the download, a last access timestamp, and a destination universal resource locator associated with the download;
sending, from the server to the portable device via the access point, a prompt including a continuation offer to resume downloading the digital data file based on the information; and
responsive to receipt of acceptance of the continuation offer, sending a remainder portion of the digital data file to the portable device, the remainder portion determined based on the information.

19. The method of claim 18, wherein the server receives capabilities information associated with the portable device before the server sends the remainder portion to the portable device.

20. The method of claim 19, wherein the capabilities information includes a data storage capacity of the portable device.

21. The method of claim 18, wherein the digital content identifier indicates a content type of the digital data file.

* * * * *